United States Patent
Nikfarjam et al.

(10) Patent No.: US 8,581,845 B2
(45) Date of Patent: Nov. 12, 2013

(54) HAND ACTIVATED INPUT DEVICE WITH HORIZONTAL CONTROL SURFACE

(75) Inventors: Jonathan S. Nikfarjam, Poughkeepsie, NY (US); Patrick M. West, Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 1416 days.

(21) Appl. No.: 11/855,395

(22) Filed: Sep. 14, 2007

(65) Prior Publication Data
US 2009/0073121 A1 Mar. 19, 2009

(51) Int. Cl.
*G06F 3/01* (2006.01)

(52) U.S. Cl.
USPC ........................................................ 345/163

(58) Field of Classification Search
USPC .................. 345/161, 163, 166, 156, 204, 157
See application file for complete search history.

(56) References Cited

U.S. PATENT DOCUMENTS

| | | | |
|---|---|---|---|
| 5,160,918 A | 11/1992 | Saposnik et al. | |
| 6,121,955 A | 9/2000 | Liu | |
| 6,323,844 B1 * | 11/2001 | Yeh et al. | 345/166 |
| 6,427,553 B1 * | 8/2002 | Hogberg et al. | 74/471 XY |
| 6,429,849 B1 | 8/2002 | An et al. | |
| 6,436,640 B1 | 8/2002 | Simmons et al. | |
| 6,580,418 B1 | 6/2003 | Grome et al. | |
| 6,892,481 B2 | 5/2005 | Yamamoto et al. | |
| 7,158,118 B2 | 1/2007 | Liberty | |
| 7,499,040 B2 * | 3/2009 | Zadesky et al. | 345/204 |
| 7,710,397 B2 * | 5/2010 | Krah et al. | 345/163 |
| 2003/0058219 A1 * | 3/2003 | Shaw | 345/161 |
| 2004/0046732 A1 * | 3/2004 | Chesters | 345/156 |
| 2004/0257339 A1 * | 12/2004 | Takahashi | 345/156 |
| 2006/0055671 A1 * | 3/2006 | Tokimoto et al. | 345/157 |
| 2006/0290671 A1 * | 12/2006 | Bohn et al. | 345/163 |

FOREIGN PATENT DOCUMENTS

| | | |
|---|---|---|
| EP | 0936529 B1 | 12/2006 |
| WO | WO 01/65329 A1 | 9/2001 |

* cited by examiner

*Primary Examiner* — Quan-Zhen Wang
*Assistant Examiner* — Tony Davis
(74) *Attorney, Agent, or Firm* — Fleit Gibbons Gutman Bongini & Bianco PL; Thomas Grzesik

(57) ABSTRACT

A cursor control device horizontally positioned operating surface is mounted on a vertical shaft connected to a biaxial joint which is enclosed in the base of the device. The hand of the operator rests on the operating surface and tips it in any direction so the shaft follows the movement of his/her hand. The motion is interpreted as X and Y coordinates on a computer display screen. The coordinate information is digitized and sent to the main computer to display a cursor on the display screen.

19 Claims, 3 Drawing Sheets

HAND ACTIVATED INPUT DEVICE WITH HORIZONTAL CONTROL SURFACE

FIELD OF THE INVENTION

This invention relates to human interface device and particularly to the coupling of human input to complex electronic and/or mechanical systems such as computer graphical operating systems.

BACKGROUND OF THE INVENTION

Many devices exist for coupling human input to complex electronic and/or mechanical systems such as computers. In a specific embodiment, this invention involves human coupling actions to a computer's interface graphical operating system using a pointing device. Known devices for addressing a graphical interface include the joystick, mouse, trackball, touch pad, and track point. The latter two are tailored to use in portable (laptop) computers and are typically embedded in the laptop while mice and track balls are external devices that can be used with both laptop or desktop computers.

While embedded pointing devices offer convenience, their functionality is constrained by their form factor. These devices tend to be small and are generally operated by a single finger. This mode of operation engages only a relatively small group of muscles, thereby limiting precision and accuracy. The touch pad additionally suffers from the need for multiple strokes to achieve long displacements of the cursor; it is difficult to traverse the entire screen with a single motion. Mice and track balls suffer from similar drawbacks concerning long cursor displacements. The travel of the mouse is limited to a constrained region of the user's work surface and by the user's reach. Operation often requires the user to lift the device and re-center it on a mouse pad, sometimes repeatedly. The trackball, like the touch pad, almost invariably requires repeated strokes.

A possible software solution for the multiple-stroke problem could be to have quick movement of the pointing device translated into an exaggerated movement of the cursor. By multiplying the input stroke by its "acceleration", a long displacement with a single movement can be achieved. However, since the input signal contains some error, the error is magnified along with the increased movement of the cursor resulting in diminished user control.

A joystick can achieve long displacements without repeated motions. However, its form factor seems to have limited widespread adoption of this device for general purpose pointing. Operating a joystick as a pointing device entails grasping its vertical structure and rocking it off the vertical axis to affect cursor movement. This operation requires awkward bending and twisting of the wrist with the hand in a somewhat unnatural position. Further, switching from the keyboard to the joystick device is a rather slow process as the grip of the joystick must be reestablished.

Therefore, it is an object of the present invention to provide an improved human/machine interface device.

It is another object of the present invention to provide a human machine interface device that provides minimal device movement for activation.

It is a further object of the invention that provides activate positioning with minimal movement of a hand or a portion thereof while the hand is supported in a comfortable palm down position while using the human/machine interface device of the present invention.

An additional object of the invention is to provide a new human machine interface device that enables easy transference of operation between the device and a keyboard.

BRIEF DESCRIPTION OF THE INVENTION

In accordance with the present invention, a substantially horizontally positioned activating surface is mounted for angular motion on a vertical shaft connected to a biaxial joint. The hand of an operator is supported palm down with at least multiple fingers thereof on the activating surface to angularly tip the surface and the shaft in any direction. The angular motion of the shaft is converted to, X and Y, coordinate data by sensors mounted on the biaxial joint. The generated coordinate information is digitized and sent to the main computer to display a cursor on the display screen for the computer. This arrangement provides an improved pointing device, which in operation, engages a larger group of muscles, does not require multiple strokes for achieving long displacements, and is operated with the hand in a natural, palm-down position. It is not necessary that the whole hand be positioned on the activating surface. The device can be operated with the fingers, while the base of the palm rests on a work surface. This position is similar to the position often employed while operating a computer keyboard so that the hand can move smoothly from the keyboard to the cursor activating surface.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features and advantages of the invention are more apparent from the following detailed description read in conjunction with the accompanying drawings in which:

DETAILED DESCRIPTION OF THE INVENTION

Figure 1:
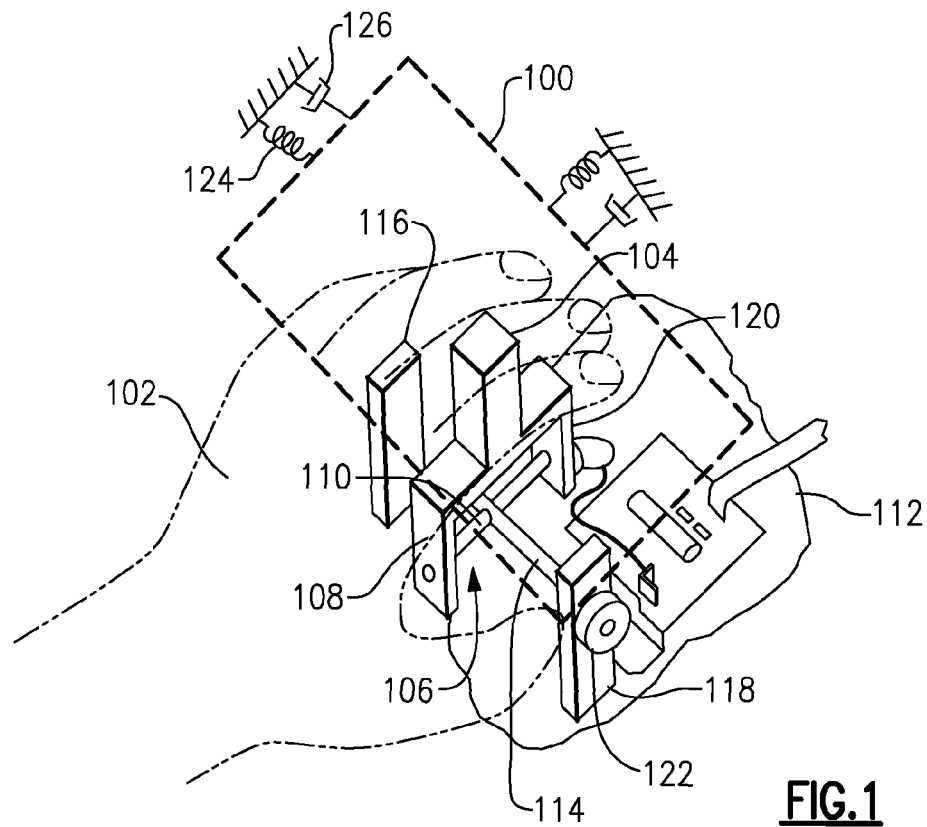
FIG. 1 is a three dimensional depiction of one embodiment of the present invention with the hand operated activation surface shown in phantom.

Referring to FIG. 1, a substantially horizontal activation surface or plate 100 for contact by a human hand 102 is fixed to a vertical shaft 104. The shaft 104 is mounted on a biaxial joint 106 that allows the activation surface 100 and the shaft 104 to angularly tilt in any direction relative to horizontal and vertical, respectively. A horseshoe shaped element 108 attaches the shaft to one arm 110 of the joint. The horseshoe element is suspended off the base 112 of the hand activated device so that shaft 104 is free to rotate around the arm 110. A second arm 114 of the biaxial joint 106 is orthogonally oriented with respect to the first arm 110 and is mounted on the base by stanchions 116 and 118 positioned at either end of the arm 114. Potentiometers 120 and 122 sense the rotation of the arms 110 and 114 relative to the horseshoe shaped collar and the base, respectively. The potentiometers are supplied an activating voltage from a battery (not shown) mounted on the base 112 of the device.

The potentiometers 120 and 122 have rotational shafts respectively for the purpose of converting angular displacement of the shafts 110 and 112 into electrical signals. Many types of sensors could be used in place of these potentiometers for measuring the angular displacement. Alternatives to the potentiometers include, but are not limited to, optical encoders and magnetic (Hall effect) sensors. The latter two sensor options may reduce mechanical friction and, thereby, reduce wear of the device.

The plate 100 is maintained in the horizontal position by springs or damping 124 and 126 attached to the base of the hand activated device which springs and damping restrain and center a plate in horizontal or rest configuration so that the potentiometers provide a null output. Alternatively, the forces can be exerted by on the vertical shaft 104. In place of the springs and dash pot shown in FIG. 1 alternative forms of restraint can be exerted on the plate 100 or shaft 104. For example, magnetic, electromagnetic or gravitational (pendulum) devices could exert the restraining forces.

Figure 2:
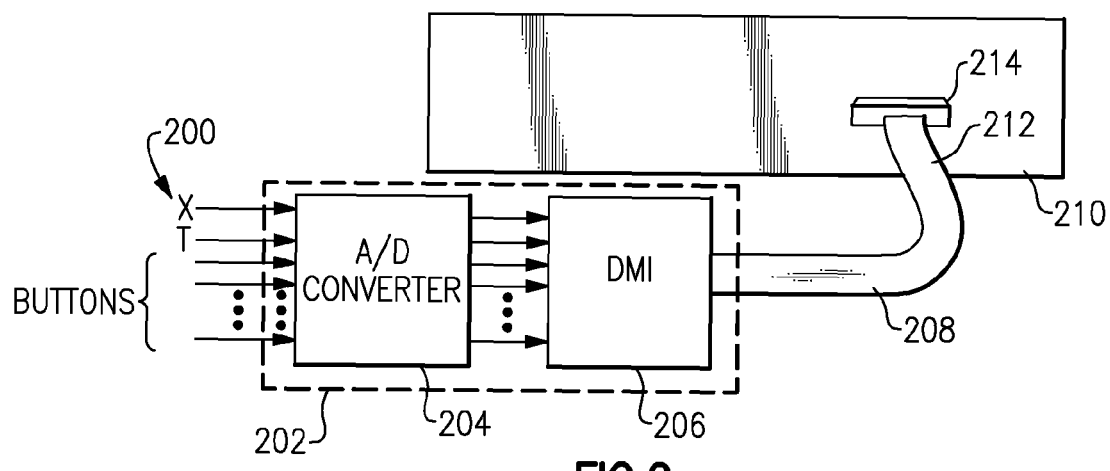
FIG. 2 is a schematic presentation of electrical elements of the present invention and their interconnection to a computer.

As shown in FIG. 2, the output signals from sensors 120 and 122 are sent over wires 200 along with signals from control buttons, described hereinafter in the discussion of with FIG. 3, to a microprocessor 202 containing analog to digital (A/D) converter 204 and a (DMI) output generator 206. The microprocessor provides signals 208 to a computer 210 controlled by the signals through a cable 212.

Computer chip 202 converts the raw angular analog output signals into a digital displacement vector. This vector is used to communicate the user's intentions relative to movement on a computer screen to the host computer 210 via cable 212 and connector 214. This communication can be implemented as a proprietary interface by the DMI output generator 206, or the generator could simply employ one of the many well-known standard interfaces. Suitable interfaces include, but are not limited to, USB, HID, Firewire, or even wireless protocols such as Bluetooth. The angular tipping of the plate causes the cursor to move across the screen. As long as the plate remains tipped from its neutral position, the cursor continues to move. The magnitude of the angular displacement determines the speed of the movement. The cable connection described above is used when the input device is separated from the computer as would be the case of a desk top computer. However if a laptop computer is used the control surface 100 and associated elements would be incorporated into the laptop computer in place of the typical touch pad of such laptops and the cable connector would not be needed.

Figure 3:
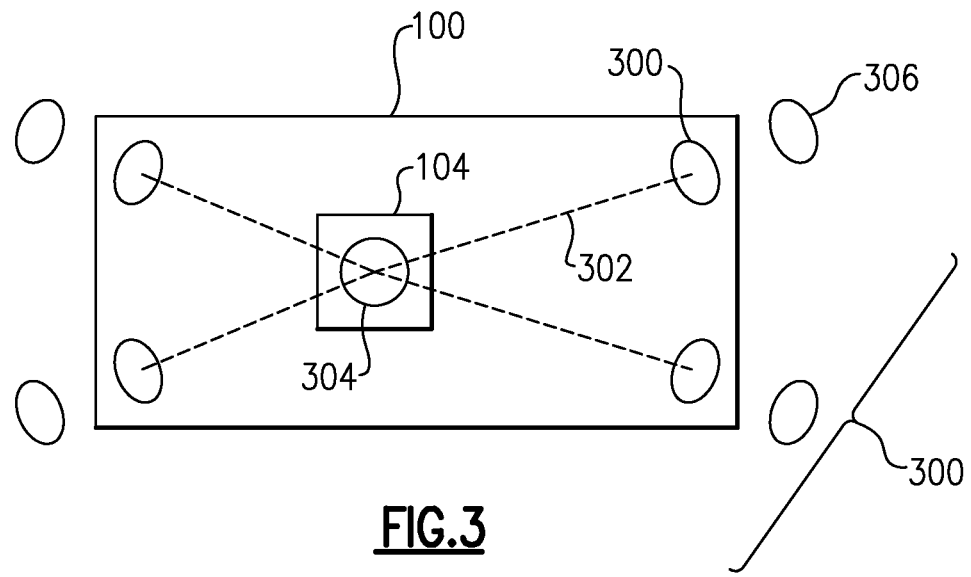
FIG. 3 is a plan diagram of a hand contacting plate containing function activation buttons.

Referring to FIG. 3, the flat plate 100 of FIG. 1 may contain button 300 for control functions for the cursor. Examples of functions controlled by these buttons may include menu activation, menu element selection, graphical control actuation scrolling and zooming, as well as other functions normally assigned to the buttons of a mouse.

When the buttons 300 are located on the plate 100, the shaft 104 would be hollow so that wires 302 would pass through the hole 304 in the shaft. Alternatively, the control buttons 306 could be located on a flat surface 308 adjacent to the touch plate 100. In such a case, the connections would not be routed through the hole 304 in the shaft 104.

As can be seen with this form of touch plate the heel of hand would lie on the flat surface 308 surrounding the plate such as would be the case of the touch plate incorporated into a laptop computer in place of the typical touch pad. This would mean that the hand would function in the manner similar to hands operating keys of a computer keyboard where the heel of the hand rests comfortably on a flat surface or a pad provided for resting the hand while fingers provide the activating force to angularly tilt the plate.

Figure 4:
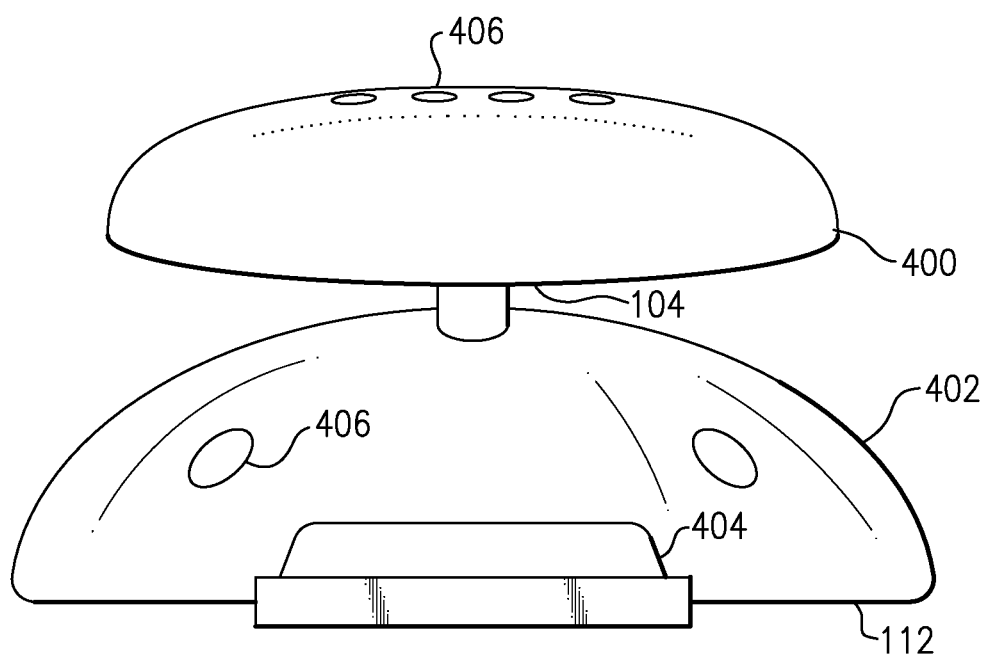
FIG. 4 is a plan view of an interface device incorporating the present invention.
Figure 5:
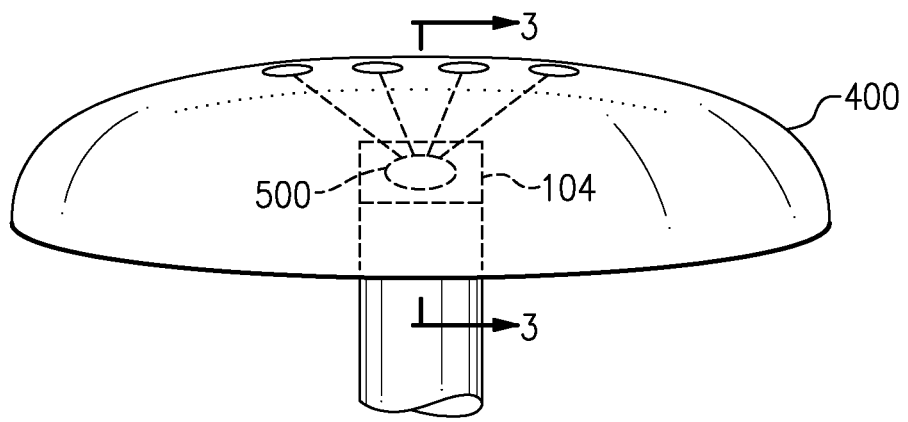
FIG. 5 is a plan view of an alternative form of the hand contact plate.
Figure 6:
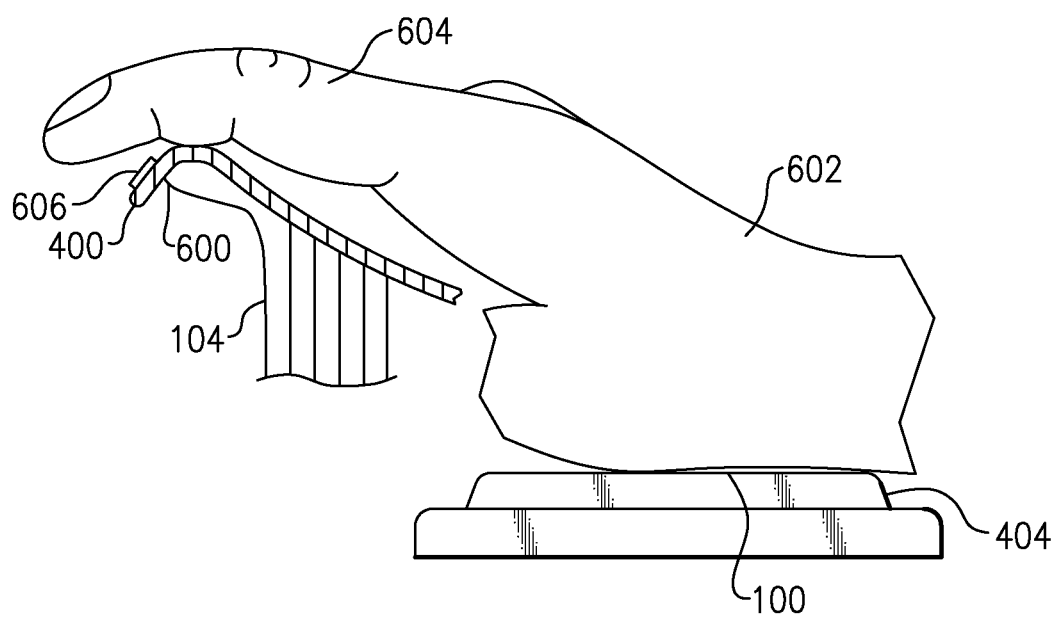
FIG. 6 is a sectional view along line 5-5 of FIG. 5.

FIGS. 4, 5 and 6 show an alternative form of the invention. This forum is a standalone mouse substitute. In this standalone device, the touch pad surface 400 is supported in a substantial horizontal orientation on a shaft such as the shaft 104 in FIG. 1, extending out of a housing 402. The housing contains the elements of the mechanism described in FIG. 1 where the base 112 of FIG. 1 is the bottom for the housing. This mouse substitute remains stationary in front of a resting surface 404. The hand (or the fingers thereof) moves the plate 400 on the shaft while the shaft 104 activates the mechanism, described previously. The shaft moves angularly in any direction directed by the touch of the hand. Buttons 406 either on the plate 400 or in the housing 402 are used to provide functions associated with the moving of the cursor on the computer screen. Where the buttons are contained on the surface of the plate, they are wired to the processor 202 shown in FIG. 2 through the opening or hole 500 in the shaft 104 in the manner shown in FIG. 3. As shown in FIG. 6, the heel pad 600 of the hand 602 rests on the hand supporting pad 404 while the fingers 604 control the orientation of the touch plate so that the touch plate can be moved by some or all fingers on the hand to change the orientation angle of the shaft in any direction. In no case is it necessary to move the device other than changing the angular over rotation of the touch plate since the angular orientation of the touch plate supplies the motion necessary to have the cursor move across a computer screen. The touch plate is curved to conform to the hand of the operator for comfort and control buttons 606 are positioned on an appendage of the plate bent away from the hand contact area so that they will not be inadvertently contacted by the operator while operating the plate. This not only prevents mistakes but prevents accidental breaking of nails of the operator while operating the touch plate.

While the preferred embodiment to the invention has been described, it will be understood that those skilled in the art, both now and in the future, may make various improvements and enhancement which fall within the scope of the claims which follow. These claims should be construed to maintain the proper protection for the invention first described.

What is claimed is:

1. A hand responsive device for controlling a cursor on a computer screen comprising:
   a base;
   a contacting surface situated on top of the base to be activated by multiple fingers of an open hand;
   a shaft supporting the contacting surface;
   a horseshoe shaped member suspended off the base, wherein the shaft is coupled to the horseshoe shaped member;
   a biaxial device supporting the horseshoe shaped member permitting angular movement of the shaft in the contacting surface so that the contacting surface angularly tips in any direction based on pressure from the multiple fingers of the open hand, the biaxial device comprising a first arm and a second arm, wherein the horseshoe shaped member is coupled to the first arm and the shaft freely rotates around the first arm, and wherein the second arm is orthogonally oriented with respect to the first arm and is mounted to the base by at least one stanchion positioned on at least a first end of the second arm;

sensors responsive to the movement of the shaft for converting the angular movement into electrical signals, wherein the sensors measure a rotation of the first arm and the second arm relative to the base; and logic circuit for translating the rotation of the first arm and the second arm that has been sensed into digital signals to move the cursor on the computer screen.

2. The hand responsive device of claim 1, wherein the contacting surface is a substantially flat and substantially horizontal surface surrounded by a second surface so that a hand operating the device rests on both surfaces.

3. The hand responsive device of claim 2, wherein the computer is a laptop computer and the hand responsive device and the second surface are incorporated into the laptop computer.

4. The hand responsive device of claim 2, wherein activation buttons surround the substantially flat and substantially horizontal surface of the device.

5. The hand responsive device of claim 1, wherein the substantially flat horizontal surface replaces a touch responsive touch pad in a laptop computer and a resting portion for the hand is a surface of the laptop computer surrounding the touch responsive surface.

6. The hand responsive device of claim 1, wherein such device is a standalone device which function as a mouse substitute.

7. The hand responsive device of claim 6, wherein the contacting surface is a curved surface which comfortably supports the hand.

8. The hand responsive device of claim 7, wherein activation buttons are contained on a appendage of the contacting surface which portion is not necessarily contacted to tilt the contacting surface.

9. The hand responsive device of claim 7, wherein the shaft of the device extends out of a cover for the device which contains activation buttons.

10. The hand responsive device of claim 1, wherein a first of the sensors is situated on a first vertical member of the horseshoe shaped member, and wherein a second of the sensors is situated on a second vertical member of the horseshoe member.

11. The hand responsive device of claim 1, wherein the rotation of the first arm and the second arm are measured as analog X and Y signals and are translated into digital signals by the logic circuit.

12. The hand responsive device of claim 11, wherein the logic circuit converts the digital signals into computer interface signals.

13. The hand responsive device of claim 12, wherein the computer interface signals constitutes one of USB, HID, Firewire and Bluetooth protocols.

14. A method for movement of a cursor across a computer screen, the method comprising:

having a tipable plate supported by a shaft for contact by multiple fingers of an open hand resting face down on a substantially flat surface for movement of the plate in angular motion around a tipping point for the plate, wherein the substantially flat surface is situated on top of a base and is coupled to at least one force exerting mechanism situated on the base, the at least one force exerting mechanism maintaining the substantially flat surface in a horizontal orientation with respect to the base;

having a horseshoe shaped member suspended off the base, wherein the shaft is coupled to the horseshoe shaped member;

having a biaxial device supporting the horseshoe shaped member permitting angular movement of the shaft, the biaxial device comprising a first arm and a second arm, wherein the horseshoe shaped member is coupled to the first arm and the shaft freely rotates around the first arm, and wherein the second arm is orthogonally oriented with respect to the first arm and is mounted to the base by at least one stanchion positioned on at least a first end of the second arm;

providing for a sensing of the angular motion of the plate around its tipping point and converting the angular motion to orthogonal data components, wherein the sensing measures a rotation of the first arm and the second arm relative to the base ; and converting the orthogonal data to digital data for interpretation of a movement of the cursor on the computer screen.

15. A user operated cursor control device comprising:

a base;

a substantially flat horizontal control surface upon which the user may rest his hand palm down while operating the device, wherein the horizontal control surface is situated on top of the base and is coupled to at least one force exerting mechanism situated on the base, the at least one force exerting mechanism maintaining the horizontal control surface in a horizontal orientation with respect to the base;

a vertical control shaft upon which the horizontal control surface is mounted;

a horseshoe shaped member suspended off the base, wherein the vertical control shaft is coupled to the horseshoe shaped member;

a biaxial joint supporting the horseshoe shaped member permitting angular movement of the shaft and the control surface, the biaxial joint comprising a first arm and a second arm, wherein the horseshoe shaped member is coupled to the first arm and the shaft freely rotates around the first arm, and wherein the second arm is orthogonally oriented with respect to the first arm and is mounted to the base by at least one stanchion positioned on at least a first end of the second arm, wherein the second arm is rotatable with respect to the stanchion; and sensors capable of measuring the angular displacement of the shaft and converting it to signals indicating orthogonal coordinates on a computer screen, wherein the sensors measure a rotation of the first arm and the second arm relative to the base.

16. The device of claim 15 including a microprocessor housed within the device.

17. The device of claim 16, wherein the microprocessor:

interprets the output of the sensors as a displacement vector; and presents the displacement vector to an external computer.

18. The device of claim 15, wherein the first arm and second arm intersect.

19. The device of claim 15, wherein the sensors are rotary potentiometers.

* * * * *